(No Model.)

F. D. HAY.
ANIMAL TRAP.

No. 518,841. Patented Apr. 24, 1894.

WITNESSES:
H. Walker
C. Sedgwick

INVENTOR
F. D. Hay
BY Munn & Co
ATTORNEYS

UNITED STATES PATENT OFFICE.

FRANK D. HAY, OF KEOKUK, IOWA, ASSIGNOR TO HIMSELF AND ROBERT J. AUGUST, OF SAME PLACE.

ANIMAL-TRAP.

SPECIFICATION forming part of Letters Patent No. 518,841, dated April 24, 1894.

Application filed November 4, 1893. Serial No. 490,005. (No model.)

*To all whom it may concern:*

Be it known that I, FRANK D. HAY, of Keokuk, in the county of Lee and State of Iowa, have invented a new and Improved Trap, of which the following is a full, clear, and exact description.

My invention relates to an improvement in traps, especially adapted for catching and caging small animals, such as rats and mice. The object of the invention is to construct the trap in an exceedingly simple and durable manner, and one wherein a dumping platform will be provided, which when the animal enters will form a perfect support, but which when the animal has advanced a predetermined distance into the trap will act to deposit the animal in the prison compartment of the trap.

Another feature of the invention is in so locating the dumping platform that it will be impossible for an imprisoned animal to escape through the medium of the platform.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1:
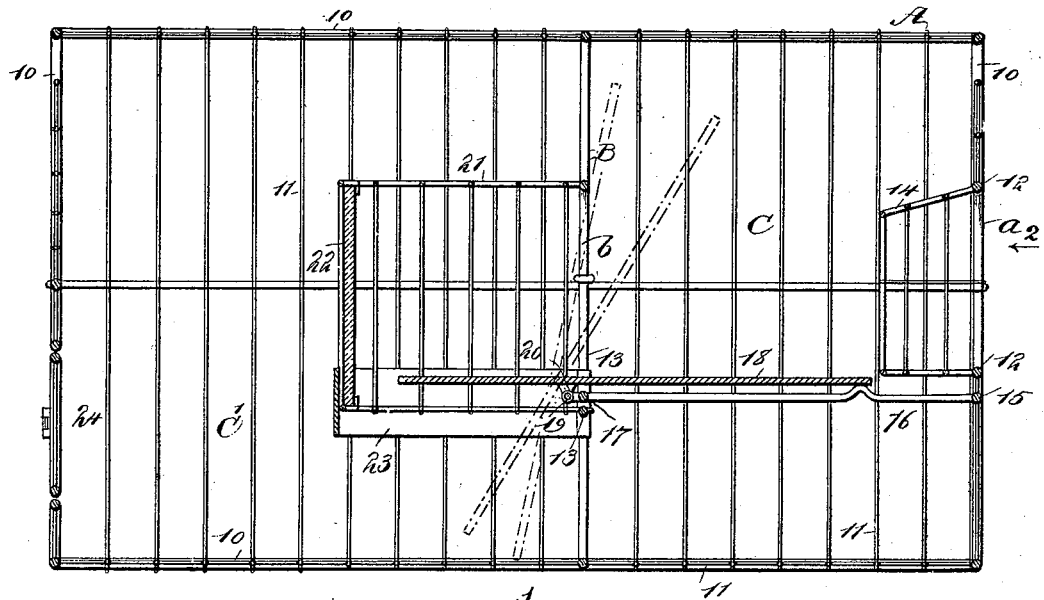
Figure 2:
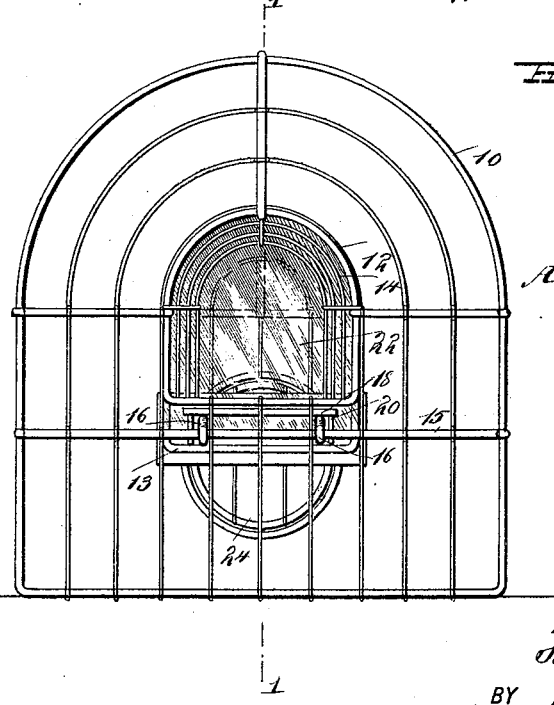

Figure 1 is a longitudinal central and vertical section through the trap, said section being taken on the line 1—1 of Fig. 2; and Fig. 2 is a view of the front end of the trap, the said end being designated by the arrow 2 in Fig. 1.

In carrying out the invention, the body A of the trap may be of any desired shape, and consists of a stout wire frame 10, covered by strands 11 of wire, the strands being arranged at such intervals apart that they will prevent the escape of the animal sought to be caught. The body of the trap is preferably provided at or near its center with a partition B, likewise made up of wire; and at the front end of the trap, and likewise in the partition, an opening more or less central is produced, the opening in the end being designated as $a$ and that in the partition as $b$. The opening in the end of the body is preferably bounded or defined by a continuous stout wire frame 12, as shown best in Fig. 2, and the opening $b$ in the partition is provided with a boundary consisting of a similar frame 13, but the frame defining the opening $b$ is preferably made deeper than that defining the front opening $a$, the lower portion of the frame 13 being shown in Fig. 2. The frame 12, at the front opening $a$, is utilized to support a housing 14, preferably made of wire and of somewhat conical construction, which housing extends into the front chamber C of the trap, since the partition B divides the body into two chambers, a front chamber C and a rear chamber C'. A cross bar 15 is located beneath the front opening $a$, and the said cross bar serves to support the outer ends of two parallel bars 16, which bars at their inner ends are connected with a cross bar 17, extending across the lower portion of the partition opening $b$, as illustrated in Fig. 1. The longitudinal bars 16, are adapted as supports for the outer end of a platform 18, which platform is fulcrumed preferably at one side of its center upon extensions 19 of the cross bar 17, the platform being provided with ears 20, by means of which it is pivoted. The platform rests at its outer end upon an upward projection, formed upon or in the longitudinal supporting rods 16, and the said platform extends a predetermined distance beyond the partition opening $b$, and through said opening into the chamber or compartment C'. The end of the platform extending into the chamber C', is inclosed in a housing 21, which is shown as of substantially rectangular construction and of wire. This housing is without a bottom, and its rear end is closed by a pane or panel 22, of glass or other transparent material; and the lower portion of the housing 21 is surrounded at its sides and rear end by a shield or guard 23, which extends downward below the lower edge of the said housing, as illustrated in both Figs. 1 and 2. The platform is so pivoted that after the animal has passed the pivot point and enters the housing 21, the weight of the animal will cause that end of the platform to drop, as shown in dotted lines in Fig. 1, causing the animal to fall into the compartment or chamber C', which is the prison compartment.

The bait is placed in the prison compartment preferably through the medium of a door 24, which is located in the rear end of the body, as illustrated in both of the views, the door being shown as of circular formation, and it is provided with any suitable form of latch.

The transparent pane or panel 22 in the housing 21, is intended to deceive the animal and lead it to believe that the end of the housing which it approaches is open and not closed. Thus the animal in endeavoring to find an escape through the rear and seemingly open end of the prison compartment housing, will step over the pivot point of the platform and will fall into the said prison compartment.

It is absolutely impossible for the animal to escape from the prison compartment through the medium of the platform, since the platform being heaviest forward of its pivot will automatically assume its normal position as soon as it is relieved of the weight of the animal, and the animal can not claw the inner end of the platform as such an action is prevented by the shield 23; and even in the event it were possible for the animal to draw down the inner end of the platform its outer end would then assume such a position as to practically close the partition opening $b$.

The trap is exceedingly simple, durable and economic in its construction, and no danger whatever attends the setting of the trap, as it is simply necessary to introduce the bait into the compartment C', as the platform automatically sets itself.

Having thus described my invention, I claim as new and desire to secure by Letters Patent—

1. In a trap, the combination with a body divided by a partition into a receiving compartment and a prison compartment, an entrance being provided from the exterior into the receiving compartment and an entrance to the prison compartment being provided in the partition, and a housing partially surrounding said opening in the partition and extending into the prison compartment, said housing being open at its lower end, of a pivoted platform leading from the entrance in the receiving chamber and extending through the entrance formed in the partition and over the opening in the bottom of the housing, the said platform being pivoted near the lower portion of the partition opening, the end of the platform in the receiving compartment being heavier than that in the prison compartment and a support for the platform located in the receiving compartment, substantially as shown and described.

2. In a trap, the combination, with a body section divided into a receiving and into a prison compartment, the partition between the two compartments having an opening therein, the trap being likewise provided with an entrance opening, of a housing located around the partition opening and extending into the prison compartment, said housing being open at its bottom and provided with a transparent pane or panel in its rear end, a second housing located around the receiving compartment, a platform pivoted at the partition, the longer end whereof extends into the receiving compartment substantially to the entrance opening, the shorter end extending into the housing of the prison compartment, a support for the receiving end of the platform, and a guard located at the housing in the said prison compartment, substantially as and for the purpose herein set forth.

FRANK D. HAY.

Witnesses:
 ROBT. D. FULTON,
 F. BROWNELL.